United States Patent [19]
Sensen et al.

[11] Patent Number: 5,951,926
[45] Date of Patent: Sep. 14, 1999

[54] PROCESS FOR CONTROLLING THE FILM THICKNESS IN A BLOWN FILM EXTRUSION LINE

[75] Inventors: Klemens Sensen, Lengerich; Ansgar Avermeyer, Georgsmarienhutte, both of Germany

[73] Assignee: Windmöller & Hölscher, Lengerich/Westf, Germany

[21] Appl. No.: 08/906,206

[22] Filed: Aug. 5, 1997

[30] Foreign Application Priority Data

Aug. 5, 1996 [DE] Germany .......................... 196 31 640

[51] Int. Cl.⁶ .................................................. B29C 47/92
[52] U.S. Cl. ...................... 264/40.6; 264/40.1; 264/40.7; 425/141; 425/144
[58] Field of Search ................................ 264/40.1, 40.7, 264/40.6; 425/141, 144, 150

[56] References Cited

U.S. PATENT DOCUMENTS

| | | | |
|---|---|---|---|
| 4,246,212 | 1/1981 | Upmeier, I | 264/40.1 |
| 4,339,403 | 7/1982 | Upmeier, II | 264/40.1 |
| 5,178,806 | 1/1993 | Predohl | 264/40.1 |
| 5,281,375 | 1/1994 | Konermann | 264/40.3 |
| 5,676,893 | 10/1997 | Cree | 264/40.1 |

FOREIGN PATENT DOCUMENTS

| | | | |
|---|---|---|---|
| 3937273 | 5/1990 | Germany | 264/40.1 |
| 0042437 | 3/1983 | Japan | 264/40.1 |
| 2178361 | 2/1987 | United Kingdom | 264/40.1 |

*Primary Examiner*—Jan H. Silbaugh
*Assistant Examiner*—Michael Poe
*Attorney, Agent, or Firm*—Jacobson, Price, Holman & Stern, PLLC

[57] ABSTRACT

To control the film thickness in a blown film extrusion line with reversing or rotating takeoff of the film bubble, the thickness profile of the blown film bubble is measured over its circumference. Different temperatures can be applied to sections of the film bubble by a die ring divided into heating sections provided with control elements or by heating elements, forming a ring around the extruded film bubble and provided with control elements. In order to correctly assign the position of the measured thickness profile to the heating sections of the die ring or the heating elements, the extruded film bubble is provided with a mark in the region of the die ring or the heating elements and the rotation of this mark is measured by a measuring device at specified intervals from the die ring or the heating elements.

11 Claims, 3 Drawing Sheets

PROCESS FOR CONTROLLING THE FILM THICKNESS IN A BLOWN FILM EXTRUSION LINE

FIELD OF THE INVENTION

The invention relates to a process for controlling the film thickness in a blown film extrusion line with reversing or rotating take-off of the film bubble, with a mechanism measuring the thickness profile of a blown film bubble over its circumference, with a die ring divided into heating sections provided with control elements or with heating elements, forming a ring around the extruded film bubble and provided with control elements, which can apply different temperatures to sections of the film bubble, where the measured thickness profile is assigned correctly with respect to the angle to the die ring or the heating elements.

BACKGROUND OF THE INVENTION

Despite the highly developed technology for controlling the average film thickness of blown films produced by the blown film extrusion process, one cannot avoid thick and thin points that are within the range of tolerance in the blown film and that overlap on the reel in such a manner during the winding up process that the reel exhibits bulges and valleys in accordance with the thick and thin points. Therefore, to obtain a cylindrical coil, the blown films produced by the blown film extrusion process are taken off in reverse or also rotatingly up to 360° by means of the taking-off collapsing rollers so that the thick and thin spots are distributed on the reel like a coil of rope.

To control the measured thick and thin spots of the blown film, it is well-known to divide the die ring of the blown film die into heating sections or to provide heating elements, forming a ring around the extruded film bubble, by means of which the measured thick spots are heated and/or the measured thin spots are cooled so that the result is an adjustment and approximation of the average film thickness.

Since the thickness profile of the extruded film bubble is measured above the socalled frost line, thus in the region, which is distant from the heating sections or the heating elements, it is especially difficult to assign the measured thick and thin points correctly with respect to the position or the angle to the die ring or the heating elements in order to achieve the necessary heating effect on the measured thick or thin spots.

The DE-PS 29 47 293 discloses a process of the aforementioned kind, by means of which it is possible to perform by calculations or by suitable rotation and twisting of the measuring devices the requisite reversing of the measured thickness profile in order to assign the measured film sections correctly with respect to the position to the die ring sections, from which they were extruded. However, this calculated reversing is not always successful, since the twisting of the film is affected by the calibrating basket and the collapsing boards, which rotate with the takeoff rolls and to which the film adheres owing to the film's stickiness.

SUMMARY OF THE INVENTION

Therefore, the object of the invention is to provide a process of the aforementioned kind, with which, taking into consideration the adhesion of the blown film to the collapsing boards, the takeoff rolls, and, if present, the calibrating device, the measured thickness profile can be correctly assigned with respect to a position of the heating sections of the die ring or the position of the heating elements.

This problem is solved in that the extruded film bubble is provided with a mark in the region of the die ring or the heating elements and the angle of rotation of this mark in front of the takeoff device or the collapsing boards rotating with the same is measured by a measuring device at specified intervals from the die ring or the heating elements.

The measuring device, which is in principle the device that will measure the thickness profile of the blown film, measures the angle of rotation of the mark, so that the measured thickness profile can be assigned correctly with respect to the angle to the die ring or the heating elements, taking into consideration the rate of takeoff, the speed of reversing or rotation, the stretching of the film bubble and the distance of the measuring device from the die ring or the heating elements.

If there is a calibrating basket, which rotates with the takeoff device or the collapsing boards, one must take into consideration when the measured thickness profile is being reversed that the film bubble adheres so tightly to the calibrating device that this region exhibits hardly any twisting.

According to a second embodiment of the invention the problem is solved in that the thickness profile of the blown film is measured at specific intervals from the die ring by two measuring devices spaced at a specific distance apart. From the blown film's angle of rotation between the two measuring devices, the distance between these measuring devices and the distance of these measuring devices from the die ring or the heating elements and the takeoff rate and the reversing or continuous rotation, the measured film sections can be assigned correctly with respect to position of the die ring or to the heating elements.

BRIEF DESCRIPTION OF THE DRAWINGS

In the following one embodiment of the invention is explained in detail with reference to the drawings.

DETAILED DESCRIPTION OF THE PREFERRED EMBODIMENTS

Figure 1:
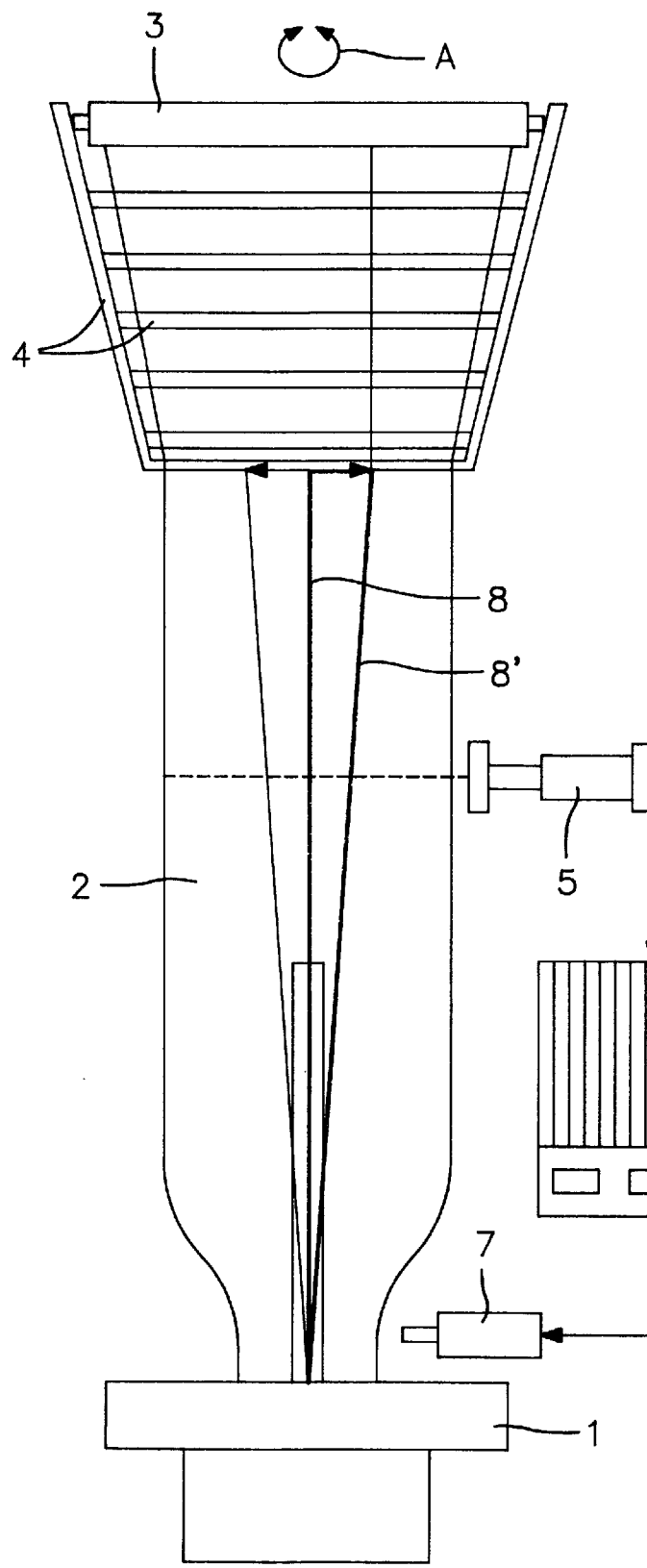
FIG. 1 depicts a graphic representation of the measurement of the angle of twist of the blown film bubble in a blown film extrusion line with a reversing takeoff device without calibrating basket.
Figure 1A:
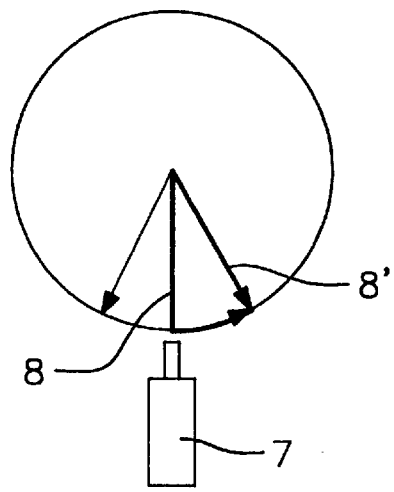
FIG. 1A is a plan view of an angular path of an introduced thick spot in the film bubble.

In the embodiment according to FIG. 1, a plastic film bubble is extruded from the annular die gap of a conventional blown film die 1, for which reason it is not explained in detail. Said film bubble is blown via crosswise stretching into a film bubble 2, taken off via longitudinal stretching by the takeoff rolls 3 and increasingly collapsed by a pair of collapsing boards 4 in the direction of the nip of the takeoff rolls 3. The film bubble 2 is taken off in reverse at an angle of up to 360°, as indicated by the bent double arrow A. To measure the thickness profile of the blown film bubble 2, there is a stationary measuring device 5, preferably an optical measuring device, which sends its measured signals for processing to an electronic computer 6. Furthermore, there is flush above the die ring of the blown film die 1 a stationary device 7, whose purpose is to affix a mark to the extruded film bubble and which blows, for example, cooled air on the film bubble, thus generating artificially a thick spot, which can then be measured by the measuring device 5.

In the case of a nonreversing takeoff, the artificially affixed mark would run along the line 8 parallel to the central axis of the extruded film bubble 2 to the takeoff rolls. If, however, a rotating or a reversing takeoff occurs, the mark migrates via displacement of angle on the line 8' to the takeoff rolls 3, assuming that no further twisting occurs in the region of the collapsing boards 4 owing to the blown film adhering to the collapsing boards.

The measuring device 5 measures the circumferential angle between the imaginary zero line 8 and the measured mark on line 8'.

From the angle at the circumference, the takeoff rate of the blown film, the height of the measuring device 5 over the blown film die and the actual reversing angle the computer 6 then calculates the angular offset at the measured point with respect to the heating sections of the die ring or the heating elements, so that a suitable reversing occurs, in order for the computer 6 to have a correcting effect with respect to position on the heating sections or the heating elements.

Figures 2, 2A:
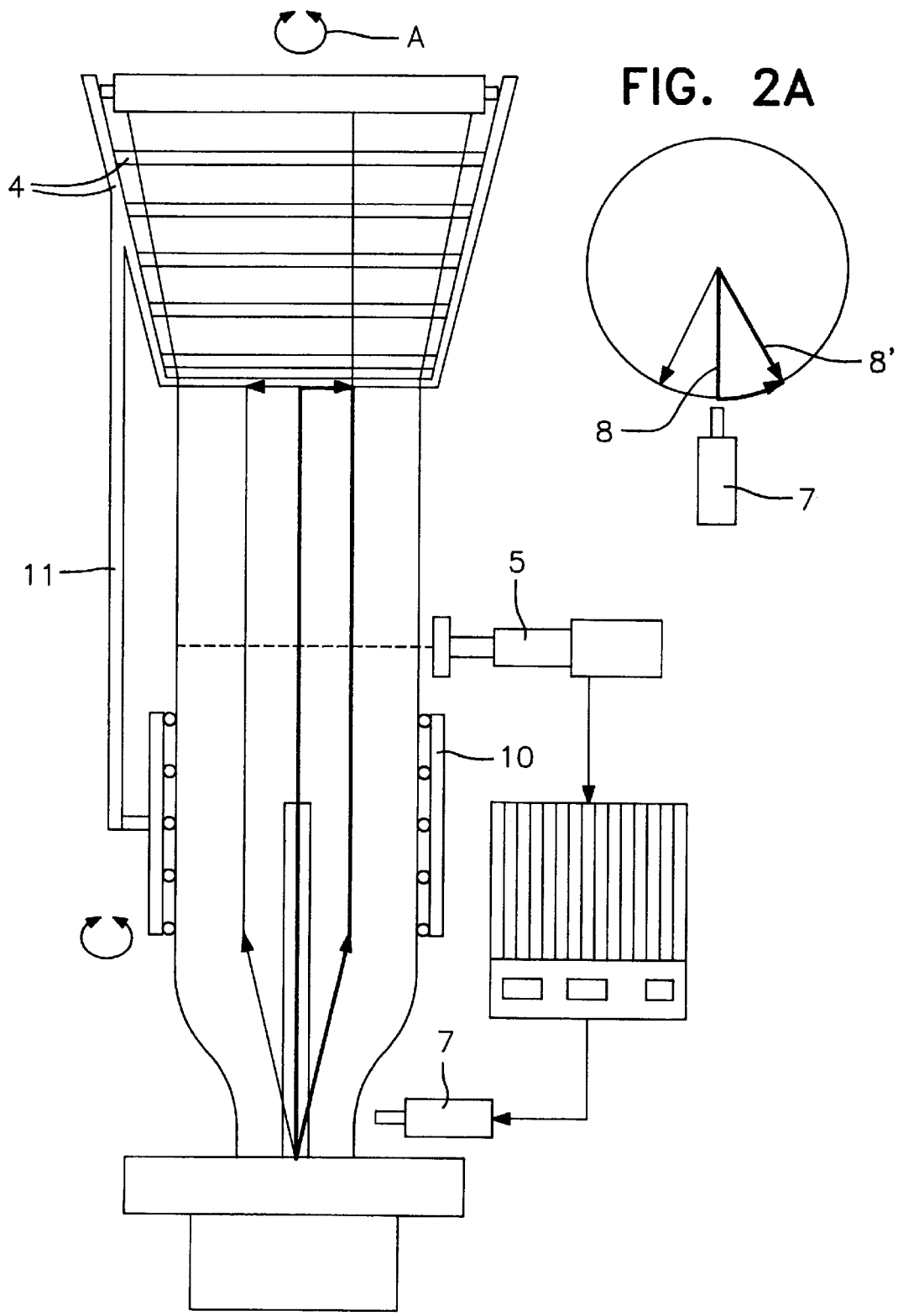
FIG. 2 depicts the measurement of the angle of twist of the blown film bubble in a blown film extrusion line according to FIG. 1.
FIG. 2A is a plan view of an angular path of an introduced thick spot in the film bubble, which is provided, however, with a calibrating basket that reverses with the collapsing boards.

The embodiment according to FIG. 2 has a calibrating basket 10, which is connected to the frame bearing the collapsing boards 4 via a support 11, so that the calibrating basket is connected rigidly to the collapsing boards and reversed with them. The angle of twist is measured in principle in the same manner as in the embodiment according to FIG. 1. In the embodiment according to FIG. 2, however, one must take into consideration that the calibrating basket 10 takes the blown film with it on account of the blown film adhering to the calibrating basket and in essence said basket does not permit the blown film to twist in the region of and above the calibrating basket 10 so that the measured angle of twist is equal to the angle of twist, when the blown film flows into the calibrating basket 10, so that instead of the height of the measuring device above the die ring or the heating elements, only its distance as far as the calibrating basket 10 must be taken into consideration.

Figures 3, 3A:
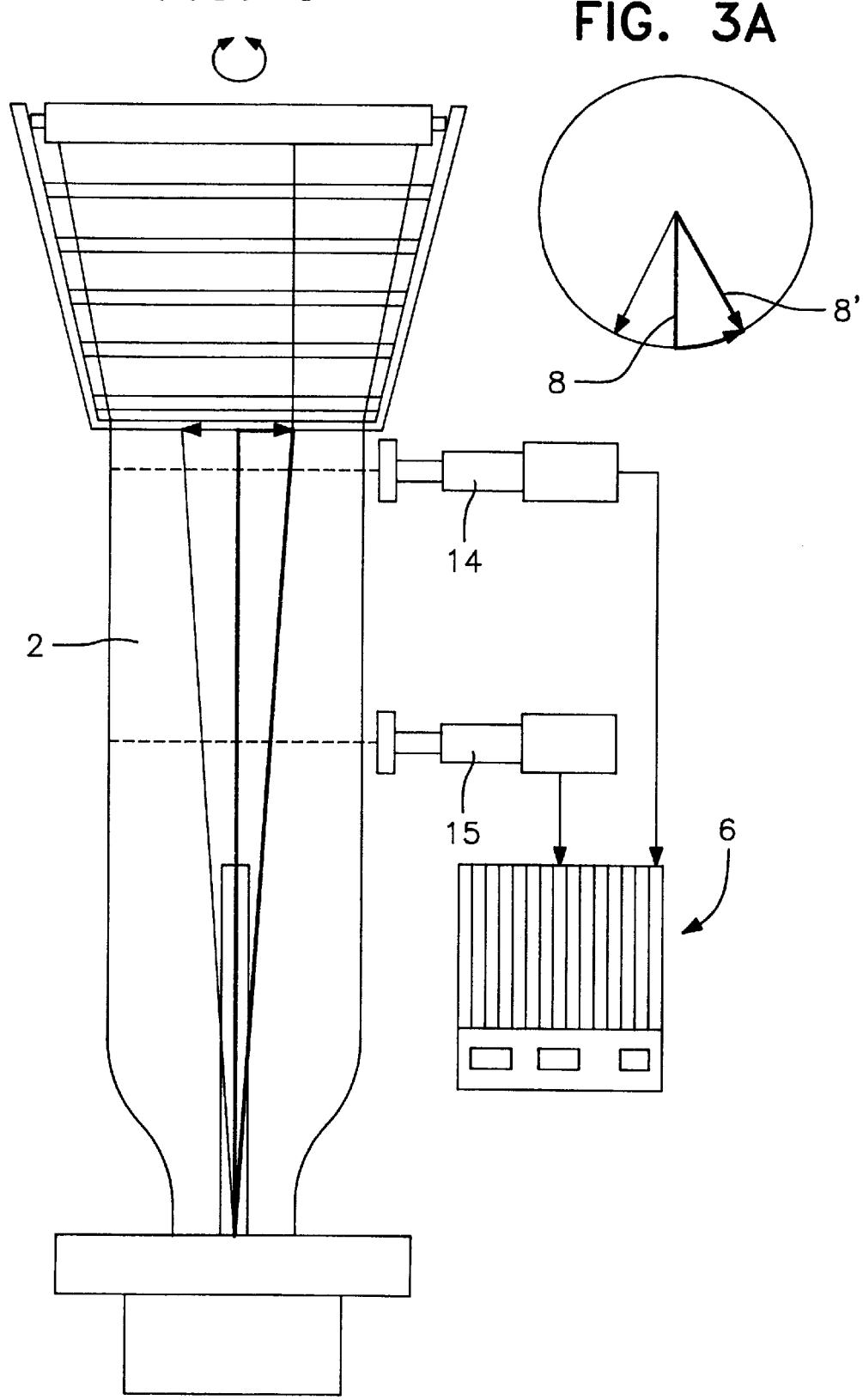
FIG. 3 depicts the measurement of the angle of twist of the blown film bubble in a blown film extrusion line according to FIG. 1 with two measuring devices, measuring the thickness profile.
FIG. 3A is a plan view of an angular twist of a film bubble.

The embodiment according to FIG. 3 has no calibrating basket. Furthermore, a marking of the film is dispensed with. To measure the thickness profile of the blown tubular film 2, there are two measuring devices 14, 15 at specific intervals from each other. Since the thickness profile of the blown tubular film between the measuring devices 14, 15 can no longer change, the blown film's angle of rotation, which said blown film experiences on its continuous path between the measuring devices 14, 15, can be determined from a comparison of these thickness profiles. From this angle of rotation and the distance of the measuring devices 14, 15 above the die ring, the takeoff rate and the momentary reversing angle, the respective angle of twist with respect to the die ring or the heating elements can be determined with the computer 6, so that the necessary reversing can take place in order to have an impact on the heating sections or the heating elements in accordance with the measured thickness profile.

We claim:

1. Process for controlling a film thickness of a film bubble extruded in a blown film extrusion line, said process comprising:

providing a reversing or rotating takeoff of the film bubble from the extrusion line, measuring a thickness profile of a circumference of the blown film bubble produced by a die ring in the extrusion line, the thickness profile being measured between the takeoff and the die head, applying a different temperature to a section of the film bubble by regulating heating sections of the die ring or by regulating heating elements forming a ring around the blown film bubble located adjacent to the die ring in an area of the film bubble where the measured thickness profile has been determined to originate from, and providing the extruded film bubble with a mark in a region of the die ring or the heating elements and the rotation of this mark also being detected by the measuring step at a specified spacing from the die ring or the heating elements to determine an angular twist of the mark at a location of the measuring step with respect to an origination point of the mark in the region of the die ring so as to regulate the heating sections of the die ring or the heating elements around the blown film bubble to control the film thickness of the film bubble at a particular location of undesired film thickness.

2. A process as claimed in claim 1, wherein the mark is introduced by blowing cool air on the film bubble.

3. A process as claimed in claim 1, wherein the film bubble thickness and location of the mark are determined by an optical measuring device.

4. A process as claimed in claim 3, wherein a signal produced by the optical measuring device is transmitted to a computer for determination of the angular offset of the mark.

5. A process as claimed in claim 1, wherein the thickness profile is measured downstream from a calibrating basket.

6. A process as claimed in claim 5, wherein the calibrating basket rotates with the reversing or rotating takeoff.

7. A process as claimed in claim 6, wherein the film bubble adheres to the calibrating basket.

8. Process for controlling a film thickness of a film bubble extruded in a blown film extrusion line, said process comprising:

producing a blown film bubble from a die ring in the extrusion line, providing a reversing or rotating takeoff for wrapping of the film bubble produced by the extrusion line, measuring a thickness profile of a circumference of the film bubble at two locations spaced along the extrusion line between the die ring and the takeoff, and regulating heating sections of the die ring or regulating heating elements forming a ring around the blown film bubble located adjacent to the die ring based upon an angular twist of the thickness profile measured at one of the two locations relative to the thickness profile measured at the other of the two locations so as to control the film thickness of the film bubble originating from the die ring.

9. A process as claimed in claim 8, wherein the thickness profile is measured by optical measuring devices.

10. A process as claimed in claim 9, wherein signals produced by the optical measuring devices are transmitted to a computer for calculation of the angular twist of the measured thickness profile.

11. A process as claimed in claim 9, wherein the optical measuring devices are located along the extrusion line at points where the thickness profiles of the film bubble do not change, only the angular twist of the thickness profile changes.

* * * * *